(12) United States Patent
Tack et al.

(10) Patent No.: US 11,408,769 B2
(45) Date of Patent: Aug. 9, 2022

(54) SPECTRAL SENSOR FOR MULTISPECTRAL IMAGING

(71) Applicant: IMEC VZW, Leuven (BE)

(72) Inventors: Nicolaas Tack, Buggenhout (BE); Nick Spooren, Mechelen (BE); Bart Vereecke, Heverlee (BE)

(73) Assignee: IMEC VZW, Leuven (BE)

( * ) Notice: Subject to any disclaimer, the term of this patent is extended or adjusted under 35 U.S.C. 154(b) by 371 days.

(21) Appl. No.: 16/592,228

(22) Filed: Oct. 3, 2019

(65) Prior Publication Data
US 2020/0109991 A1  Apr. 9, 2020

(30) Foreign Application Priority Data

Oct. 4, 2018 (EP) ..................... 18198547

(51) Int. Cl.
*G01J 3/28* (2006.01)
*G01J 3/36* (2006.01)

(52) U.S. Cl.
CPC ............. *G01J 3/2823* (2013.01); *G01J 3/36* (2013.01); *G01J 2003/2826* (2013.01)

(58) Field of Classification Search
CPC ..... G01J 3/2823; G01J 3/36; G01J 2003/2826
See application file for complete search history.

(56) References Cited

U.S. PATENT DOCUMENTS

| | | |
|---|---|---|
| 5,144,498 A | 9/1992 | Vincent et al. |
| 9,372,118 B1 | 6/2016 | Taplin et al. |
| 2005/0133693 A1 | 6/2005 | Fouquet et al. |
| 2008/0123097 A1 | 5/2008 | Muhammed et al. |
| 2009/0302407 A1 | 12/2009 | Gidon et al. |
| 2011/0102562 A1* | 5/2011 | Johnson, Jr. ......... H04N 13/334 348/58 |
| 2013/0120843 A1 | 5/2013 | Junger et al. |
| 2016/0273958 A1 | 9/2016 | Hoenk et al. |

(Continued)

FOREIGN PATENT DOCUMENTS

| | | |
|---|---|---|
| CN | 1 737 613 A | 2/2006 |
| CN | 101 533 159 B | 9/2011 |

OTHER PUBLICATIONS

European Search Report, European Patent Application No. 18198547. 4, dated Apr. 11, 2019, 12 pages.

*Primary Examiner* — Thanh Luu
(74) *Attorney, Agent, or Firm* — McDonnell Boehnen Hulbert & Berghoff LLP (57) ABSTRACT

A spectral sensor comprises (i) a first type of interference filter comprising reflective multilayers of a first type and an intermediate layer configured to give a constructive interference for a wavelength in a first range, and (ii) a second type of interference filter comprising reflective multilayers of a second type and an intermediate layer configured to give a constructive interference for a wavelength in a second range. The sensor further comprises first and second filter stacks configured to selectively transmit light in the first and second wavelength ranges to first and second photo-sensitive areas, respectively. The first filter stack includes the first type of interference filter and a second type of dielectric mirror that is reflective in the second wavelength range. The second filter stack includes the second type of interference filter and a first type of dielectric mirror that is reflective in the first wavelength range.

17 Claims, 3 Drawing Sheets

(56) References Cited

U.S. PATENT DOCUMENTS

2017/0005132 A1\* 1/2017 Vereecke .................. G01J 3/50
2017/0163901 A1 6/2017 Lin et al.
2018/0204863 A1 7/2018 Tack et al.

\* cited by examiner

SPECTRAL SENSOR FOR MULTISPECTRAL IMAGING

CROSS-REFERENCE TO RELATED APPLICATION

The present application is a non-provisional patent application claiming priority to European Patent Application No. 18198547.4 filed Oct. 4, 2018, the contents of which are hereby incorporated by reference.

TECHNICAL FIELD

The present disclosure relates to a spectral sensor for acquiring spectral information of an object. In particular, the present disclosure relates to acquiring an image including spectral information.

BACKGROUND

In many applications, it is desired to acquire spectral images of an object. Spectral imaging implies that the spectral content of an image of the object is extracted and incident electro-magnetic radiation relating to multiple narrow bands of wavelengths is detected. The spectral imaging may, for instance, be used in analysis of imaged objects, such as for determining whether a substance having a specific spectral profile is present in the object.

The terms "multi-spectral imaging" and "hyperspectral imaging" are often used. These terms do not have established definitions, but multi-spectral imaging may refer to spectral imaging using a plurality of discrete wavelength bands, whereas hyperspectral imaging may refer to imaging narrow spectral wavelength bands over a continuous spectral range. Hyperspectral imaging may also often use a larger number of spectral bands than what is used in multi-spectral imaging.

With advances to semiconductor fabrication, it is now possible to produce image sensors based on complementary metal-oxide-semiconductor (CMOS) technology, wherein a substrate comprising an array of photo-sensitive areas is integrated with filters for selectively transmitting light to the photo-sensitive areas.

The integrated filters may define different wavelength bands associated with different photo-sensitive areas. For instance, spectral bands may be associated with different rows of photo-sensitive areas, such that when a line-scan is performed an image of high spectral and spatial resolution may be acquired. Alternatively, a mosaic configuration of wavelength bands may be arranged on the array of photo-sensitive areas, such that a set of photo-sensitive areas is associated with a plurality of filters and may together acquire spectral information of a portion of an object. An image sensor having a mosaic configuration of filters may be used for acquiring an image with a spectral resolution in a single exposure (snapshot).

The spectral range of these integrated filters, implemented by stacking alternating layers of low and high refractive index, depends heavily on the contrast in the refractive index of the materials. The spectral range is limited by the availability of the used materials, but may be extended by adding additional filter stacks next to the other stacks. However, this may be a problem when using small pixels since a certain space is required between the pixels for the transition of one stack to the other. This leads to a reduced fill factor and increased cross-talk.

There is thus a need in the art for a convenient way of achieving spectral imaging using small pixels.

SUMMARY

It is an object of the present disclosure to at least partly overcome one or more limitations of the prior art. In particular, to the present disclosure provides a spectral sensor for multi- or hyperspectral imaging that has improved manufacturability.

As a first aspect of the present disclosure, there is provided a spectral sensor for acquiring spectral information of an object, the spectral sensor comprising: (i) an array of photo-sensitive areas forming pixels; (ii) a first type of interference filter comprising at least two reflective multilayers of a first type, wherein the multilayers are separated by an intermediate layer configured to give a constructive interference for a wavelength in a first wavelength range; (iii) a second type of interference filter comprising at least two reflective multilayers of a second type, wherein the multilayers are separated by an intermediate layer configured to give a constructive interference for a wavelength in a second wavelength range other than the first wavelength range; (iv) a first type of filter stack configured to selectively transmit light in a first wavelength band of the first wavelength range to a first photo-sensitive area, and comprising the first type of interference filter and a second type of dielectric mirror, wherein the second type of dielectric mirror is reflective in the second wavelength range and comprises at least two reflective multilayers of the second type separated by an intermediate layer configured to give a destructive interference for a wavelength in the second wavelength range; and (v) a second type of filter stack configured to selectively transmit light in a second wavelength band of the second wavelength range to a second photo-sensitive area, and comprising the second type of interference filter and a first type of dielectric mirror, wherein the first type of dielectric mirror is reflective in the first wavelength range and comprises at least two multilayers of the first type separated by an intermediate layer configured to give a destructive interference for a wavelength in the first wavelength range.

The spectral sensor may be an image sensor for acquiring an image of an object. The image sensor may, e.g., be a multi- or hyperspectral image sensor, i.e., a sensor for acquiring spectral information for pixels in the image plane. The spectral information may be for wavelengths within and/or beyond the visible light spectrum.

A photo sensitive area may be or comprise a sensor element for detecting photons, e.g., a photodetector. Thus, the array of photo-sensitive areas may form an array of sensor elements for detecting different wavelength bands. The array may comprise more than 106 photo sensitive areas. The array may be in two dimensions or only in one row.

The first and second type of interference filters may be Fabry-Perot filters, comprising high-reflectance multilayers separated by an intermediate layer, which is configured to give a constructive interference for a wavelength. The intermediate layer may therefore have a thickness so that the filter resonates with the desired wavelength frequencies. Thus, an intermediate layer may have a thickness being an integer number of $\lambda/2$, wherein $\lambda$, is a wavelength that is transmitted by the filter. The layers within the multilayers of the interference filters may have a thickness that is $\lambda/4$. The intermediate layer may be a solid material, or it may be a cavity.

The multilayers are arranged parallel to each other and an interference filter may comprise several intermediate layers separated by the multilayers. Several such intermediate layers may increase the steepness of the passband, i.e., the band of frequencies through which the filter will pass light.

Thus, the interference filters may be narrow bandpass filters, rejecting undesired wavelengths and allowing wavelengths in the first or second wavelength range to pass through.

According to an example embodiment, the first wavelength range corresponds to a range of a peak reflectivity of the multilayers of the first type, and the second wavelength range corresponds to a range of a peak reflectivity of the multilayers of the second type.

The multilayers may be configured to have a high reflectivity over a relatively broad wavelength range. The multilayers may provide constructive interference of reflections from multiple interfaces in the multilayers. A central wavelength may be defined by a thickness of the layers in the multilayers, whereas a range in which a high reflectivity may be provided may be defined by a difference in refractive index between materials used in the multilayers. Thus, there is a limitation in a breadth over which the multilayers may provide a peak reflectivity, as set by the refractive index of materials used in the multilayers.

A limit of the first and second wavelength ranges, respectively, may be determined based on the following expression:

$$\frac{\Delta f_0}{f_0} = \frac{4}{\pi} \arcsin\left(\frac{n_2 - n_1}{n_2 + n_1}\right),$$

wherein $\Delta f_0$ is a frequency bandwidth of the range, $f_0$ is a central frequency of the range, $n_1$ is a refractive index of a first material used in the multilayer, and $n_2$ is a refractive index of a second material used in the multilayer.

The first and second wavelength ranges may be set by the multilayers of the first and second type, respectively. Thanks to the use of multilayers of the first and the second type (e.g., using different materials or different thicknesses of layers in the multilayers of the first and the second type), the spectral sensor may be sensitive to wavelengths in a very broad wavelength range, as the spectral sensor may not be limited to the wavelength range in which one type of multilayer provides a high reflectivity. In this regard, the first and second wavelength ranges may be non-overlapping or may have a small or partial overlap. In some examples, an overlap of the first and second wavelength ranges is small, so that the combined spectral range of the spectral sensor as defined by the combined first and second wavelength ranges may be as large as possible.

The first type of interference filter may be used to select a wavelength band within the first wavelength range, the wavelength band being defined by the intermediate layer. A thickness of the intermediate layer may define the wavelength band for which constructive interference is provided by the first type of interference filter. By varying the thickness of the intermediate layer, different wavelength bands within the first wavelength range may be selected. Similarly, the second type of interference filter may be used to select a wavelength band within the second wavelength range, the wavelength band being defined by the intermediate layer. A thickness of the intermediate layer may define the wavelength band for which constructive interference is provided by the second type of interference filter. By varying the thickness of the intermediate layer, different wavelength bands within the second wavelength range may be selected.

Thus, according to an example embodiment, the spectral sensor may comprise a plurality of different filter stacks using the first type of interference filter and the second type of dielectric mirror, wherein the different filter stacks have different thicknesses of the intermediate layer of the first type of interference filter in order to transmit different wavelength bands within the first wavelength range to different photo-sensitive areas, while the different filter stacks have the same thickness of the intermediate layer of the second type of dielectric mirror. The thickness of the intermediate layer of the second type of dielectric mirror is chosen in order to obtain a function of a dielectric mirror within the second wavelength range. This function is not dependent on the wavelength band to be transmitted by the filter stack (which wavelength band is in the first wavelength range) and hence regardless of the wavelength band to be transmitted by a filter stack, the thickness of the intermediate layer of the second type of the dielectric mirror may be the same.

Similarly, the spectral sensor may comprise a plurality of different filter stacks using the second type of interference filter and the first type of dielectric mirror, wherein the different filter stacks have different thicknesses of the intermediate layer of the second type of interference filter in order to transmit different wavelength bands within the second wavelength range to different photo-sensitive areas, while the different filter stacks have the same thickness of the intermediate layer of the first type of dielectric mirror.

The first and second interference filters may be arranged over a plurality of photo-sensitive areas in the array.

The dielectric mirrors function as a Bragg mirror and are reflective to wavelengths outside the wavelength range of the filter stack in which they are arranged. The dielectric mirrors function based on the interference of light reflected from the different layers of the reflective multilayers. The dielectric mirrors comprise reflective multilayers separated by an intermediate layer. Such an intermediate layer is configured to give a destructive interference, e.g., by having a thickness that is $\lambda/4$, $3\lambda/4$, $5\lambda/4$, etc., wherein $\lambda$ is a wavelength for which the dielectric mirror is reflective.

Thus, the intermediate layer in the dielectric mirror may have a thickness that is $\lambda(2n-1)/4$, wherein n is an integer number. The dielectric mirrors may comprise the same type of multilayer structure as an interference filter. Thus, the first type of interference filter and the first type of dielectric mirror comprise the first type of multilayers, whereas the second type of interference filter and the second type of dielectric mirror comprise the second type of multilayers. An interference filter may thus be converted to a dielectric mirror by configuring the intermediate layer or layers that are arranged in between the multilayers to a desired thickness.

The reflective multilayers of an interference filter or a dielectric mirror may comprise alternating layers of high refractive index and low refractive index.

The filter stacks comprise at least an interference filter and a dielectric mirror on top of each other. A filter stack is further arranged over a pixel, so that light passes the filter stack before reaching the pixel.

A single photo-sensitive area may be associated with a single type of filter stack, and it should also be realized that a plurality of different photo-sensitive areas may be associated with identical filter stacks.

The first aspect of the present disclosure is based on the insight that it may be advantageous to stack filters on top of each other instead of next to each other when manufacturing multispectral imagers or spectral sensors. The spectral sensor of the first aspect thus provides a simplified construction of a sensor, such as when the filters are monolithically integrated onto the photo detectors. In some embodiments, different filter stacks may be manufactured by depositing two interference filters, or bandpass filters, on top of each other, and then trimming the intermediate layer or cavities in one of the stacked filters back to the optical thickness of a Bragg stack. This means that light in the spectral range of this "trimmed" or "modified" filter is reflected instead of transmitted, whereas light in the spectral range of the other filter in the stack is transmitted.

Consequently, a plurality of different filter stacks having transmittance for a plurality of different wavelength bands may be manufactured using only two different interference filters having two different types of multilayer structures and only changing the intermediate layer or cavities within the stack to a desired thickness depending on if the filter structure (multilayers+cavities) is to work as a dielectric mirror or a bandpass filter for a specific wavelength band. This reduces layer complexity of the patterned filter with positive impact on crosstalk and manufacturability. This principle can be extended to stacking more than two stacks on top of each other as long as the Bragg mirrors that are stacked transmit the light required for the bandpass filters.

In other words, the interference filters used are configured for allowing transmitting wavelength bands within a specific wavelength range. In order to cover a wide spectral range, different multilayer structures may be used, i.e., a first type of reflective multilayer in the first type of interference filter and a second type of reflective multilayer in the second type of interference filter. By placing the filters on top of each other and trimming the intermediate layers to desired thickness if the filter is to be used as a mirror or filter, the same type of multilayers may be deposited over a plurality of pixels or photo-sensitive areas at the same time, thereby decreasing or eliminating the need for subsequent etching. Further, the filter stacks may be positioned in close proximity to each other on the array of photo-sensitive areas.

The wavelength band of the interference filter in a stack may be spectrally spaced from the reflection band of the dielectric mirror of the same stack, since Bragg stacks may have a gradual fall off from high reflection to high transmission.

It is to be understood that the spectral sensor may comprise further types of filter stacks. Such filter stacks may comprise further interference filters and dielectric mirrors stacked on top of each other in order to achieve the desired filter transmittance and characteristics. A filter stack may, for example, comprise at least two, at least three, or at least four interference filters stacked on top of each other. Such stacks may also comprise at least two, or at least three, dielectric mirrors. Thus, a variety of different stacks may be provided by using different combinations of the same type of reflective multilayers and configuring the intermediate layers to desired thicknesses.

In some embodiments of the first aspect, the first and/or second type of reflective multilayer comprise alternating layers of different materials having different refractive index and/or thickness. The multilayers may, for example, be a stack of at least four, or at least six, alternating layers. The multilayers may thus be built by alternating a single layer of high refractive index with a single layer of low refractive index, so that every other layer in the multilayer is the same. Thus, a reflective multilayer may comprise two different layers alternated to form a stack or reflective multilayers.

The reflective multilayers of the first and second type may be configured for reflecting or transmitting different wavelength ranges by having different refractive index and/or thickness.

As an example, the reflective multilayers of the first and second type may differ in having different thickness of the alternating layers or differ in having different material in the alternating layers.

Consequently, the multilayer of the first type, used in the first type of interference filter and in the first type of dielectric mirror, may have a first thickness or be of a first type of material, whereas the multilayer of the second type, used in the second type of interference filter and in the second type of dielectric mirror, may have a second thickness or be of a second type of material. Such differences may thus lead to the multilayers of the first and second type being configured for reflecting or transmitting different wavelength ranges.

In some embodiments of the first aspect, the second type of dielectric mirror is arranged on top of the first type of interference filter in the first type of filter stack, and the second interference filter is arranged on top of the first type of dielectric mirror in the second type of filter stack.

Thus, the first type of reflective multilayers, present in the first type of interference filter and in the first type of dielectric mirror, may be arranged below the second type of reflective multilayers, present in the second type of interference filter and in the second type of dielectric mirror, in both the first and second types of filter stacks.

This may increase the manufacturability because the first type of reflective multilayer may be deposited over several photo-sensitive areas before depositing the second type of reflective multilayer structure over the photo sensitive areas, thereby forming different filter stacks over the photo-sensitive areas after trimming the cavities between the multilayers to appropriate thickness.

As an example, the first and second photo-sensitive areas may be arranged adjacent to each other on the array. Thus, the first type of multilayer may conveniently be deposited over at least two adjacent photo-sensitive areas.

The spectral sensor may comprise several types of different filter stacks with transmittance in different wavelength bands, depending on the spectral resolution required. Thus, in embodiments of the first aspect, the spectral sensor, in addition to the first and second types of filter stacks, comprises at least two additional different types of filter stacks to form four different types of filter stacks configured to selectively transmit at least four different wavelength bands within the first and the second different wavelength ranges to at least four different photo-sensitive areas, wherein each of the four different filter stacks comprises the first type of interference filter and the second type of dielectric mirror, or the second type of interference filter and the first type of dielectric mirror.

Furthermore, in some embodiments of the first aspect, the spectral sensor, in addition to the first and second types of filter stacks, comprises at least seven additional different types of filter stacks to form nine different types of filter stacks, wherein the nine different types of filter stacks are configured to selectively transmit at least nine different wavelength bands within the first and the second different wavelength ranges to at least nine different photo-sensitive areas, wherein each filter stack comprises the first type of interference filter and the second type of dielectric mirror, or the second type of interference filter and the first type of dielectric mirror.

The spectral sensor may cover a large band of wavelengths by using a combination of different filter stacks. As an example, the first wavelength range may be in the near ultraviolet band or in the near infrared range, whereas the second wavelength range may be in the mid infrared or in the far infrared range. As another example, both the first and second wavelength ranges are in the visible region, or the first wavelength range is in the visible region whereas the second wavelength range is in the near infrared or in the mid infrared region.

In some embodiments of the first aspect of the present disclosure, the first and second wavelength ranges are spectrally not overlapping, such as being spectrally spaced by at least 50 nm, at least 100 nm, or at least 200 nm. However, the first and second wavelength ranges may also be overlapping.

In some examples, the first wavelength range may be a wavelength range within the interval 400-650 nm and the second wavelength range may be a range within the interval 700-1000 nm. However, other wavelength ranges are possible, such as wavelengths in the range of 100-400 nm and wavelengths above 1000 nm.

CMOS fabrication technology allows production of very small size layer structures. Thus, it is possible with CMOS fabrication technology to create filters integrated with a substrate comprising photo-sensitive areas. Thus, in some embodiments of the first aspect, the filter stacks are monolithically integrated on the array of photo-sensitive areas. This implies that the filter stacks are fixedly associated with the photo-sensitive areas and that a relation between the filter stacks and the photo-sensitive areas will not be altered after the spectral sensor has been manufactured. Further, the filter stacks may be produced on the array of photo-sensitive areas using CMOS manufacturing processes, such as selective depositing and etching of layers in order to form the different interference filters and filter stacks. This may be beneficially used with a CMOS substrate providing the array of photo-sensitive areas.

In some embodiments of the first aspect, the array of photo-sensitive areas comprises a plurality of sub-arrays, wherein each sub-array comprises the first type of filter stack over a first photo-sensitive area and a second type of filter stack over a second photo-sensitive area. However, it is to be understood that the first and second type of filter stacks may be randomly distributed over the array.

A sub-array thus forms a "macropixel" within the array of photo-sensitive areas. The sub-arrays may form a mosaic configuration of the filter stacks over the pixels.

As an example, the filter stacks within each sub-array of the plurality of sub-arrays may be configured to selectively transmit different wavelength bands to different photo-sensitive areas. Thus, a sub-array may comprise a first type of filter stack for transmitting a first wavelength band to a first photo-sensitive area within the subarray, a second type of filter stack for transmitting a second wavelength band to a second photo-sensitive area within the subarray, and a third type of filter stack for transmitting a third wavelength band to a third photo-sensitive area within the subarray. The sub-array may have a 2×2 configuration, i.e., comprising four photo-sensitive areas, or a 3×3 configuration, i.e., comprising nine photo-sensitive areas. However, any type of pixel configuration A×B within the sub-array is possible. Consequently, in some embodiments of the first aspect, each sub-array comprises at least four photo-sensitive areas, or at least nine photo sensitive areas.

Furthermore, the different sub-arrays of the plurality of sub-arrays may comprise the same type of filter stacks. Thus, the sub-arrays may be identical or substantially similar to each other, meaning that the whole array of photo-sensitive areas may be built of a number of identical or substantially similar sub-arrays, each sub-array being sensitive to the same wavelength bands. This may allow for imaging of high spectral resolution.

In some embodiments of the first aspect, the spectral sensor further comprises a multiband filter arranged in the optical path of at least one type of filter stack and configured for transmitting light in the wavelength range of the filter stack and for reflecting light outside the wavelength range of the filter stack.

The multiband filter may be a multiband glass filter. Thus, an additional multiband filter, such as a cover glass filter, may be used to fine tune the transmission spectra of the filter stacks. As an example, the multiband filter may be arranged at a distance (d) from the filter stack. This makes it possible to first produce photo-sensitive areas with filter stacks, such as monolithically integrated filter stacks, in a single production run, and afterwards vary the filter specifications like full width at half maximum (FWHM) and out-of-band (OOB) transmission at imager level by selecting the appropriate multiband optical filter. This minimizes layer complexity during manufacture, and the combined effect of the filter stacks and the multiband filter may produce a cleaner and more specific transmission spectrum reaching the photo-sensitive areas.

As a second aspect of the present disclosure, there is provided an imaging apparatus comprising the spectral sensor according to the first aspect discussed herein above. Thus, the spectral sensor may be an image sensor that is integrated into an imaging apparatus for acquiring an image of an object. The imaging apparatus may, for instance, further comprise an optical system for forming an image of an object onto an image plane in which the image sensor may be arranged.

Effects and features of this second aspect are largely analogous to those described above in connection with the first aspect. Embodiments mentioned in relation to the first aspect are largely compatible with the second aspect.

BRIEF DESCRIPTION OF THE DRAWINGS

The above, as well as additional objects, features, and advantages of the present disclosure, will be better understood through the following illustrative and non-limiting detailed description, with reference to the appended drawings. In the drawings like reference numerals will be used for like elements unless stated otherwise.

DETAILED DESCRIPTION

Detailed embodiments of the present disclosure will now be described with reference to the drawings.

Figure 1A:
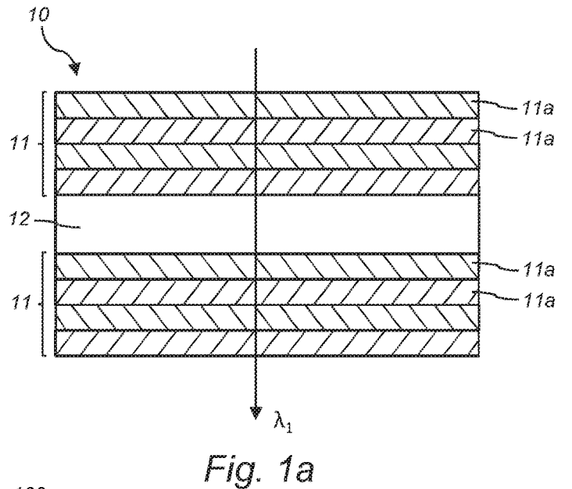
FIG. 1a is a schematic illustration of a first type of interference filter.
Figure 1B:
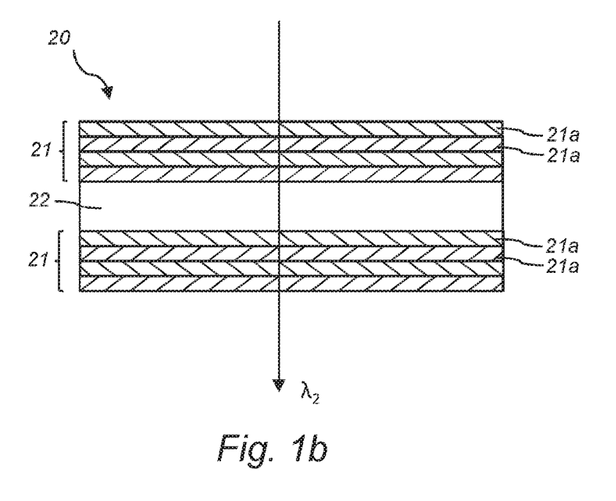
FIG. 1b is a schematic illustration of a second type of interference filter.

FIGS. 1a and 1b show two examples on the build-up of a first type of interference filter 10 and a second type of interference filter 20. The first type of interference filter 10 comprises two reflective multilayers 11 of a first type that are separated by an intermediate layer 12. The filter 10 is a narrow bandpass filter of a Fabry-Perot type, and the thickness of the intermediate layer 12 defines a wavelength $\lambda_1$ of a transmission peak of the filter in a first wavelength range, such as a wavelength $\lambda_1$ of 530 nm. The intermediate layer 12 thus forms a transparent layer arranged between the two reflective multilayers 11. By varying the thickness of the intermediate layer 12, the wavelength peak may be shifted. The thickness of the intermediate layer 12 of the first type of interference filter 10 is a multiple of $\lambda_1/2$ in order to provide for strong transmission of the wavelength $\lambda_1$ in the first wavelength range. The intermediate layer 12 is of a solid material but could also be in the form of a cavity.

The second type of interference filter 20, schematically shown in FIG. 1b, also comprises two reflective multilayers 21 with an intermediate layer 22 in between. Also, the second type of interference filter is of a Fabry-Perot type, and the thickness of intermediate layer 22 defines a wavelength $\lambda_2$ of a transmission peak of the filter in a second wavelength range, such as a wavelength $\lambda_2$ of above 700 nm, such as 730 nm. The intermediate layer 22 thus forms a transparent layer arranged between the two reflective multilayers 21. The intermediate layer 22 is of a solid material but could also be in the form of a cavity. The thickness of the intermediate layer 22 of the second type of interference filter 20 is a multiple of $\lambda_2/2$ in order to provide for strong transmission of the wavelength $\lambda_2$ in the second wavelength range.

The second wavelength range of the second type of filter 20 is different than the first wavelength range of the first type of filter 10. The wavelength ranges may be different in that they do not overlap. The first and second wavelength ranges may be spectrally separated by at least 100 nm, or at least 250 nm.

The first wavelength range may correspond to a wavelength range within which the two reflective multilayers 11 of the first type have a high reflectivity. The second wavelength range may correspond to a wavelength range within which the two reflective multilayers 21 of the second type have a high reflectivity.

The reflective multilayers 11 of the first type of interference filter 10 and the reflective multilayers 21 of the second type of interference filter 20 may comprise alternating layers of materials having different refractive indices. Light is reflected in the interfaces between the layers of different refractive index so as to create constructive interference for specific wavelengths of light having traveled different path lengths through the multilayers corresponding to being reflected a different number of times in the interfaces. By selection of thickness and materials of the reflective multilayers 11 and 21, the wavelength transmission characteristics of the interference filters 10 and 20 may be controlled.

The first type of reflective multilayers 11 in the first type of interference filter 10 differs from the second type of reflective multilayers 21 in the second type of interference filter 20, e.g., by having different thickness or having different materials in the alternating layers. Thus, the first and second type of interference filters 10, 20 may be formed using the same materials and providing different thicknesses of at least some of the reflective multilayers 11, 21 in order to have different wavelength transmission characteristics for the different interference filters 10 and 20. As a result, the interference filters 10 and 20 may be produced in parallel processes, wherein a first layer is formed for both interference filters 10 and 20 before a second layer is deposited on top of the first layer.

Figure 2A:
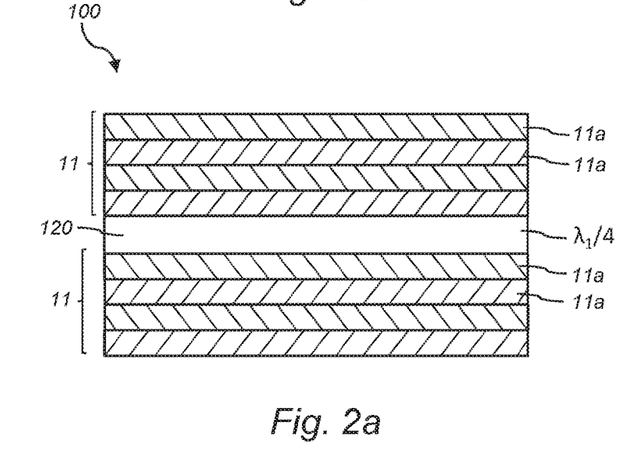
FIG. 2a is a schematic illustration of a first type of dielectric mirror.
Figure 2B:
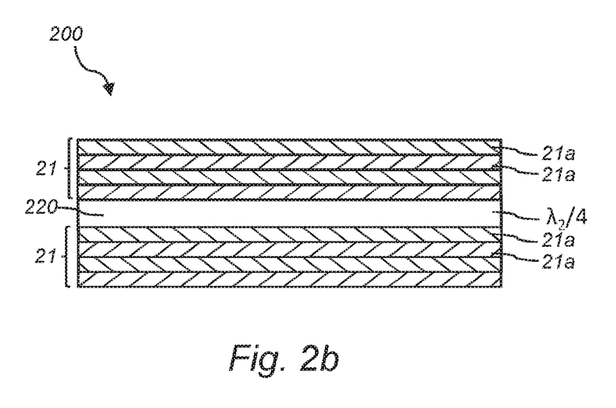
FIG. 2b is a schematic illustration of a second type of dielectric mirror.

FIGS. 2a and 2b show examples on how the same multilayer structures used for the first 10 and second 20 interference filters may be used for forming a first type of dielectric mirror 100, shown in FIG. 2a, and a second type of dielectric mirror 200, shown in FIG. 2b. The first type of dielectric mirror 100 has the same reflective multilayers 11 as the first interference filter 10, but the intermediate layer 120 between the reflective multilayers has been configured to have a thickness that is a quarter of a wavelength in the first wavelength range, such as $\lambda_1/4$. In this way, the multilayers 11 and intermediate layer 120 of the first type of dielectric mirror 100 will be reflective in the first wavelength range. Similarly, the second type of dielectric mirror 200 comprises the same type of multilayers 21 used in the second type of interference filter 20, but the intermediate layer 220 in between the multilayers 21 is configured to be a quarter of a wavelength in the second wavelength range, such as $\lambda_2/4$.

Thus, when configuring the multilayer structure used for a filter into a Bragg mirror, it becomes reflective for a certain limited wavelength range. By using at least two types of reflective multilayers, individual dielectric mirrors may be produced that cover a variety of different wavelength ranges.

Figure 3:
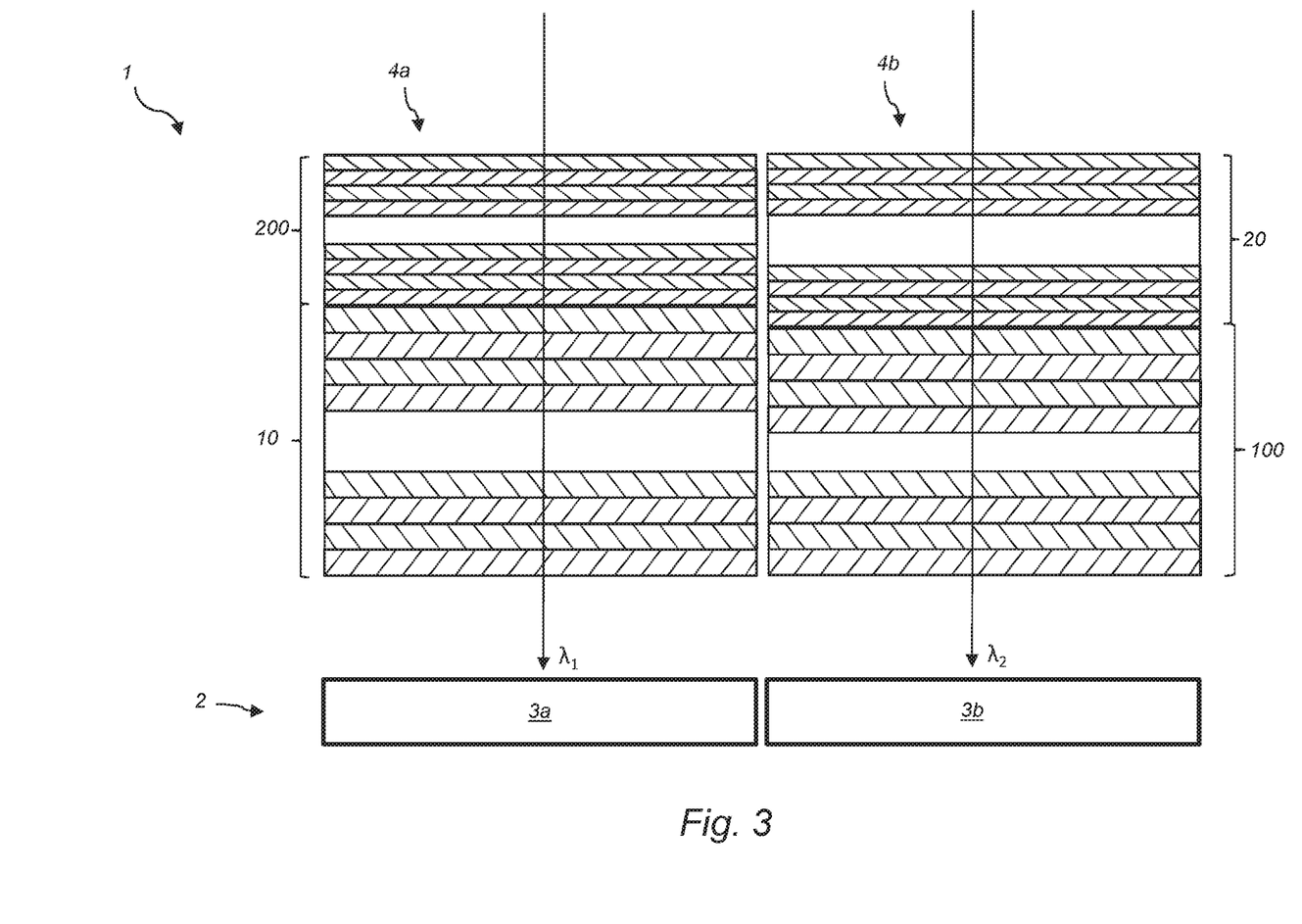
FIG. 3 is a schematic illustration of a section of a spectral sensor.

FIG. 3 shows a schematic sectional illustration of spectral sensor 1 of the present disclosure. The spectral sensor 1 is, in this embodiment, an image sensor for acquiring an image of an object, such as a multi- or hyperspectral image of an object.

The sensor 1 comprises an array 2 of photo-sensitive areas 3a, 3b forming pixels. The array 2 is, in this case, a two-dimensional array but, for clarity, only two photo-sensitive areas 3a, 3b are shown in the sectional view of FIG. 3. It is to be understood that the array 2 may comprise a plurality of photo-sensitive areas, such as at least 106 photo-sensitive areas. The photo-sensitive areas 3a, 3b may be arranged to accumulate charges in dependence of light incident on the photo-sensitive areas 3a, 3b. The photo-sensitive areas 3a, 3b may thus each comprise, e.g., a photodiode or a photo-transistor.

The configuration of the image sensor 1 may allow for flexibly designing characteristics of detecting wavelength information in images. The image sensor 1 may be based on a complementary metal-oxide-semiconductor (CMOS) structure. The CMOS structure may comprise the array 2 of photo-sensitive areas 3a, 3b and may further comprise circuitry, e.g., for reading out detected light intensities in the photo-sensitive areas 3a, 3b and for timing accumulation of light in the light-detecting elements. The CMOS structure may also comprise circuitry for processing the detected light intensities, such as analog-to-digital converters (ADC) and/or other processing components. The CMOS structure may thus provide a possibility of detecting light intensities and outputting an image representation, e.g., in the form of digital values of the light intensities detected by each photo-sensitive area 3a, 3b in the array 2.

The image sensor 1 further comprises the first type of filter stack 4a arranged over photo-sensitive area 3a and the second type of filter stack 4b over an adjacent photo-sensitive area 3b. The first type of filter stack 4a allows transmission of a first wavelength range including wavelength $\lambda_1$, whereas the second type of filter stack 4a allows transmission of a second wavelength range including wavelength $\lambda_2$. In the first type of filter stack 4a, the second type of dielectric mirror 200 is arranged on top of the first type of interference filter 10, whereas the second type of interference filter 20 is arranged on top of the first type of dielectric mirror 100 in the second type of filter stack 4b. Arranging the filter stacks 4a and 4b over adjacent pixels allows for improved manufacturability since the multilayers of the first type, included in the first type of interference filter 10 in the first type of filter stack 4a and included in the first type of dielectric mirror 100 in the filter stack 4b, may be deposited simultaneously, and then the filter 10 and the mirror 100 may be obtained by trimming the cavities between the first type of multilayers to desired thickness. Similarly, once the first type of filter 10 and the first type of mirror 100 are deposited, the second type of multilayer, included in the second type of dielectric mirror 200 and in the second type of interference filter 20, may be deposited on top of the first interference filter 10 and the first type of dielectric mirror 100, respectively. FIG. 3 thus show how the spectral sensor provides for improved manufacturability, such as how formation of different types of filter stacks, or narrow bandpass filters, having transmittance for different wavelengths, may be achieved using only two types of reflective multilayers with different intermediate layers in between.

Figure 4:
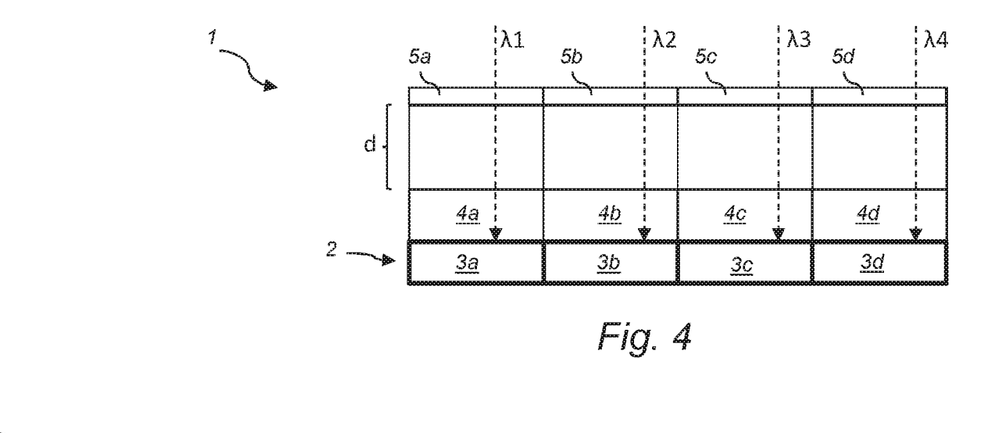
FIG. 4 is a further schematic illustration of a section of a spectral sensor.

FIG. 4 shows a further embodiment of the image sensor 1 of the present disclosure. As in the embodiment shown in FIG. 3, the sensor 1 comprises an array 2 with photo-sensitive areas 3a-d, onto which different types of filter stacks 4a-d are formed for transmitting light of wavelengths $\lambda_1$-$\lambda_4$. The photo-sensitive areas 3a-d form a continuous area in a substrate sensitive to incoming light. The different types of filter stacks 4a-d are arranged side-by-side on the single continuous area.

In this case, the filter stacks 4a-d are monolithically integrated on top of the photo-sensitive areas 3a-d. Further, there are multiband filters 5a-d built on cover glass and arranged a distance d from the filter stacks 4a-d, as seen in the optical path of the light reaching the photo-sensitive areas 3a-d. The combined effect of the monolithically integrated filters 4a-d and the multiband filters 5a-d produces a cleaner and more specific transmission spectrum reaching the photodiodes 3a-d. Thus, the combined effect of the filters provides flexibility to manipulate the parameters of the spectral transmission, such as the full width of half maximum (FWHM) and the out-of-band transmission. The use of the multiband filters 5a-d arranged a distance from the filter stacks 4a-d relaxes the constraints in the construction of the monolithically integrated filters. Thus, the multiband filters 5a-d may be manufactured in a separate stage, and it creates the opportunity to do a single production run on image wafers and vary the filter specifications by selecting particular multiband filters 5a-d.

Figure 5:
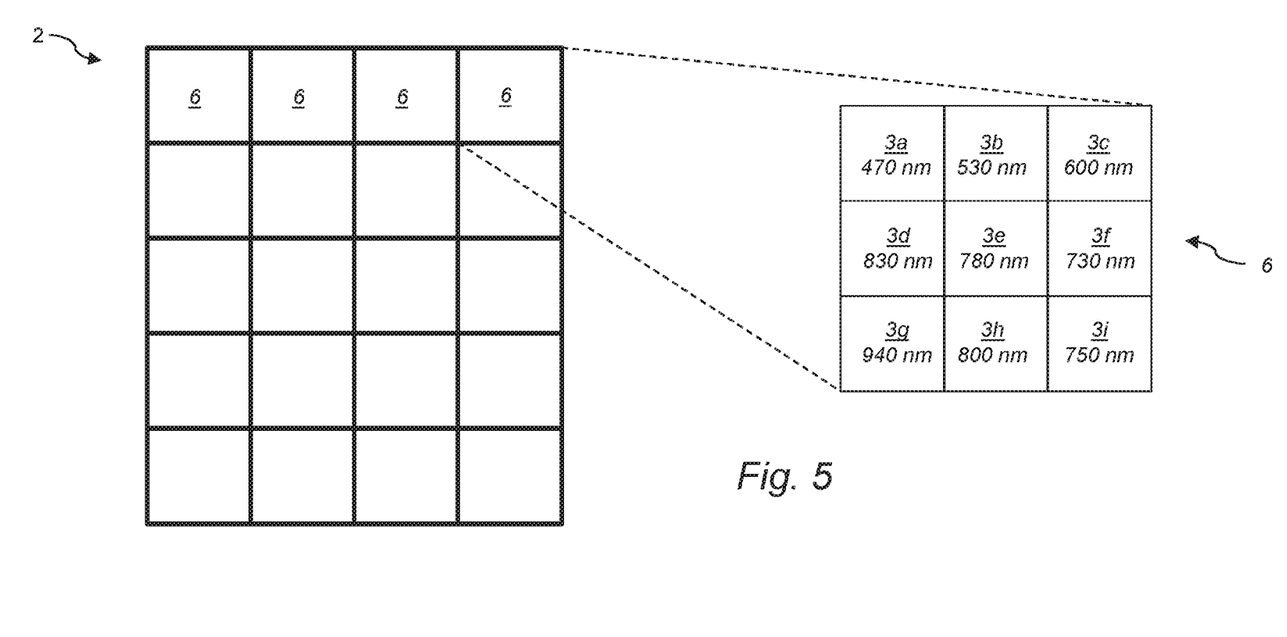
FIG. 5 is an illustration of an array of photo-sensitive areas comprising sub-arrays.

FIG. 5 shows a top view of the implementation of the array 2 of photo-sensitive areas 3a-i according to an example embodiment of the present disclosure. The array 2 of photo-sensitive areas 3a-i is formed on a substrate, wherein each photo-sensitive area 3a-i is a continuous area within the substrate and wherein each photo-sensitive area 3a-i is configured to detect incident light.

The array 2 may comprise identical photo-sensitive areas 3a-i which are arranged in rows and columns in order to form a two-dimensional array. A CMOS structure comprising the array 2 may thus be relatively simple and may also be useful for a number of different applications. As a result, chips carrying the array 2 with an associated read-out and control circuitry may be manufactured in large volumes and may, therefore, be less expensive. Thus, the image sensor 1 may be formed based on a mass-manufactured CMOS structure.

The array 2 with associated circuitry may be formed on a substrate, wherein desired functionality of the CMOS structure may be achieved by forming a plurality of layers on the substrate. A thickness of the substrate may then be reduced, such that illumination may fall on the photo-sensitive areas 3a-i through the substrate, through so-called backside illumination. As a result, the light will not need to pass through layers arranged on the CMOS structure, e.g., for readout, and, hence, losses of light due to reflections or absorptions in such layers may be avoided. Thus, backside illumination may provide a possibility to detect as much light as possible, enabling imaging with a high quality.

In the array 2 of FIG. 5, the photo-sensitive areas 3a-i are arranged in sub-arrays 6, wherein each sub-array 6 comprises the nine photo-sensitive areas 3a-i arranged in a 3×3 pattern. However, it is to be understood that the sub-arrays 6 may comprise any number of photo-sensitive areas, such as at least four, at least six, or at least twelve photo-sensitive areas. In this particular example, each sub-array 6 comprises nine different filter stacks, defining narrow bandpass filters with transmission peaks between 470 nm and 750 nm, as illustrated in FIG. 5. Thus, the filter stacks arranged over the photo-sensitive areas in a sub-array are selected such that the photo-sensitive areas 3a-i within a sub-array 6 are sensitive to different wavelength bands. The range of filter stacks may be manufactured using the combination of interference filters and dielectric mirrors as explained above. As an example, all nine filter stacks arranged on top of the photo-sensitive areas in a sub-array may be manufactured by depositing the first and second type of reflective multilayers with intermediate layers in between. The intermediate layers are configured with thicknesses to form different types of interference filters and dielectric mirrors to tune the spectral characteristics of each filter stack.

Further, the sub-arrays 6 within the array 2 are in this example identical, i.e., they have the same number and types of filter stacks arranged over the photo-sensitive areas 3a-i. The sub-arrays 6 may be arranged as a mosaic pattern forming the whole array 2.

The present disclosure has mainly been described with reference to a limited number of examples. However, as is readily appreciated, other examples than the ones disclosed above are equally possible within the scope of the present disclosure, as defined by the appended claims.

What is claimed is:

1. A spectral sensor for acquiring spectral information of an object, the spectral sensor comprising:
   an array of photo-sensitive areas forming pixels;
   a first type of interference filter comprising at least two reflective multilayers of a first type, wherein the multilayers of the first type are separated by a first intermediate layer configured to give a constructive interference for a wavelength in a first wavelength range;
   a second type of interference filter comprising at least two reflective multilayers of a second type, wherein the multilayers of the second type are separated by a second intermediate layer configured to give a constructive interference for a wavelength in a second wavelength range other than the first wavelength range;
   a first type of filter stack configured to selectively transmit light in a first wavelength band of the first wavelength range to a first photo-sensitive area of the array, wherein the first type of filter stack comprises (i) the first type of interference filter and (ii) a second type of dielectric mirror, wherein the second type of dielectric mirror is reflective in the second wavelength range and comprises at least two reflective multilayers of the second type separated by a third intermediate layer configured to give a destructive interference for a wavelength in the second wavelength range; and a second type of filter stack configured to selectively transmit light in a second wavelength band of the second wavelength range to a second photo-sensitive area of the array, wherein the second type of filter stack comprises (i) the second type of interference filter and (ii) a first type of dielectric mirror, wherein the first type of dielectric mirror is reflective in the first wavelength range and comprises at least two multilayers of the first type separated by a fourth intermediate layer configured to give a destructive interference for a wavelength in the first wavelength range, and wherein the second type of dielectric mirror is arranged on top of the first type of interference filter in the first type of filter stack, and the second interference filter is arranged on top of the first type of dielectric mirror in the second type of filter stack.

2. The spectral sensor according to claim 1, wherein the first wavelength range corresponds to a range of a peak reflectivity of the multilayers of the first type, and the second wavelength range corresponds to a range of a peak reflectivity of the multilayers of the second type.

3. The spectral sensor according to claim 1, wherein the first and second wavelength ranges are spectrally not overlapping.

4. The spectral sensor according to claim 1, further comprising a plurality of different filter stacks using the first type of interference filter and the second type of dielectric mirror, wherein the different filter stacks have different thicknesses of the first intermediate layer of the first type of interference filter in order to transmit different wavelength bands within the first wavelength range to different photo-sensitive areas of the array, and wherein the different filter stacks have the same thickness of the third intermediate layer of the second type of dielectric mirror.

5. The spectral sensor according to claim 1, wherein at least one of the reflective multilayers of the first type or the reflective multilayers of the second type comprise alternating layers of different materials having different refractive indices or thicknesses.

6. The spectral sensor according to claim 5, wherein the reflective multilayers of the first and second type differ in having different thicknesses of the alternating layers or differ in having different materials in the alternating layers.

7. The spectral sensor according to claim 1, wherein the first and second photo-sensitive areas are arranged adjacent to each other on the array.

8. The spectral sensor according to claim 1, further comprising, in addition to the first and second types of filter stacks, at least seven additional different types of filter stacks to form nine different types of filter stacks, wherein the nine different types of filter stacks are configured to selectively transmit at least nine different wavelength bands within the first and second different wavelength ranges to at least nine different photo-sensitive areas of the array, wherein each of the nine different types of filter stacks comprises (i) the first type of interference filter and the second type of dielectric mirror or (ii) the second type of interference filter and the first type of dielectric mirror.

9. The spectral sensor according to claim 1, wherein the first wavelength range is a wavelength range within an interval of 400-650 nm, and the second wavelength range is a range within an interval of 700-1000 nm.

10. The spectral sensor according to claim 1, wherein the first and second types of filter stacks are monolithically integrated on the array of photo-sensitive areas.

11. The spectral sensor according to claim 1, wherein the array of photo-sensitive areas comprises a plurality of sub-arrays, and wherein each respective sub-array comprises (i) the first type of filter stack over a first respective photo-sensitive area and (ii) the second type of filter stack over a second respective photo-sensitive area.

12. The spectral sensor according to claim 11, wherein the filter stacks within each respective sub-array of the plurality of sub-arrays are configured to selectively transmit different wavelength ranges to different respective photo-sensitive areas.

13. The spectral sensor according to claim 11, wherein each respective sub-array comprises at least four respective photo-sensitive areas.

14. The spectral sensor according to claim 11, wherein each respective sub-array of the plurality of sub-arrays comprises the same types of filter stacks.

15. The spectral sensor according to claim 1, further comprising a multiband filter arranged in an optical path of at least one of the filter stacks, wherein the multiband filter is configured for transmitting light in the wavelength range of the at least one of the filter stacks and for reflecting light outside the wavelength range of the at least one of the filter stacks.

16. The spectral sensor according to claim 15, wherein the multiband filter is arranged at a distance (d) from the at least one of the filter stacks.

17. An imaging apparatus comprising the spectral sensor according to claim 1.

* * * * *